United States Patent [19]
Nakamura

[11] Patent Number: 5,909,284
[45] Date of Patent: Jun. 1, 1999

[54] METHOD AND SYSTEM FOR MEASURING AN INNER DIAMETER OF A HOLE FORMED IN AN OBJECT

[75] Inventor: Taizo Nakamura, Kawasaki, Japan

[73] Assignee: Mitutoyo Corporation, Kawasaki, Japan

[21] Appl. No.: 09/060,378

[22] Filed: Apr. 15, 1998

[30] Foreign Application Priority Data

Apr. 23, 1997 [JP] Japan .................................... 9-105917

[51] Int. Cl.⁶ .................................................. G01B 11/02
[52] U.S. Cl. ........................... 356/384; 356/378; 356/386
[58] Field of Search ..................... 356/384, 378, 356/386

[56] References Cited

U.S. PATENT DOCUMENTS

| 3,806,252 | 4/1974 | Harris et al. | 356/378 |
| 3,873,211 | 3/1975 | Watson | 356/378 |
| 4,105,925 | 8/1978 | Rossol et al. | 356/378 |

*Primary Examiner*—Frank G. Font
*Assistant Examiner*—Reginald A. Ratliff
*Attorney, Agent, or Firm*—Oliff & Berrigde, PLC

[57] ABSTRACT

A light beam from a light source is formed into an annular beam and an inner wall of a hole in an object is illuminated with the annular beam. The annular beam reflected from the inner wall of the hole is received as an annular image and a diameter of the annular image is measured, from which an inner diameter of the hole can be determined

16 Claims, 2 Drawing Sheets

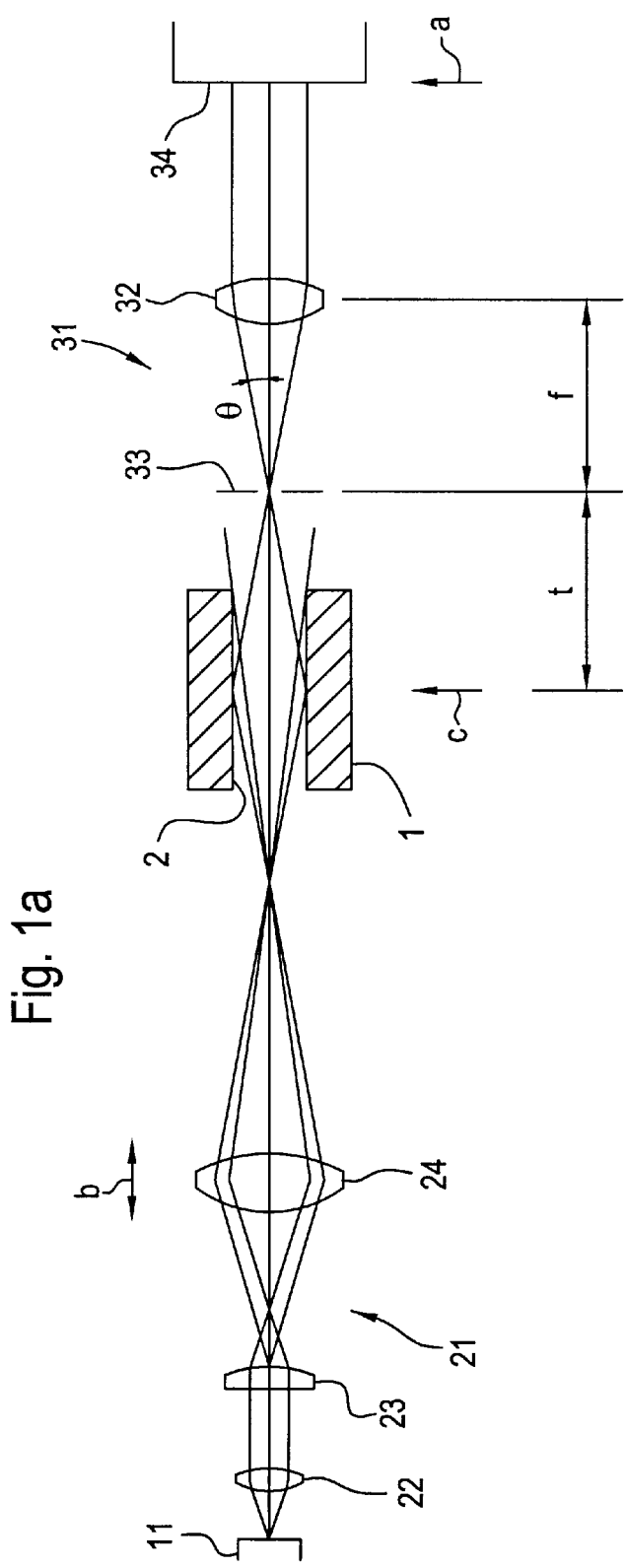

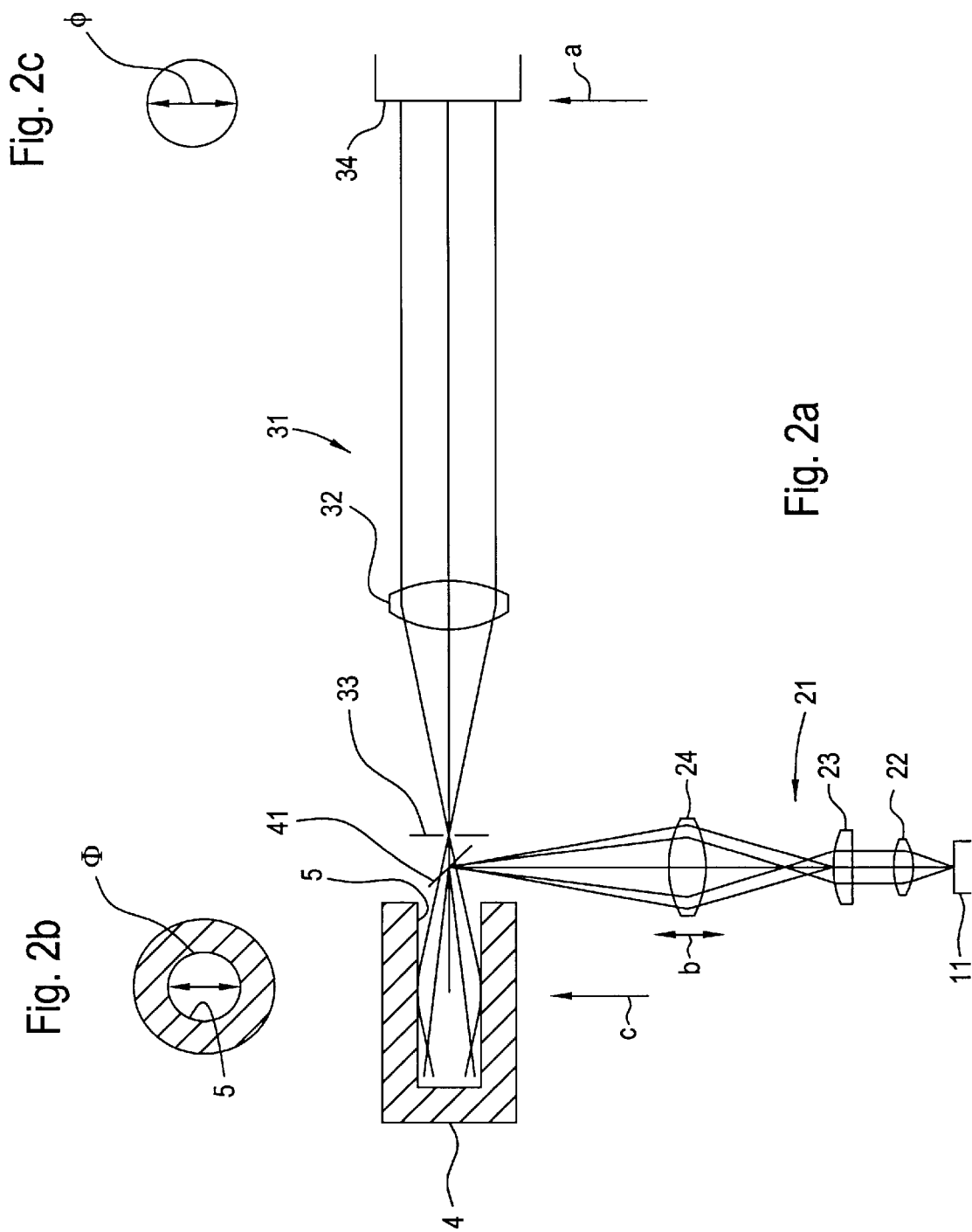

METHOD AND SYSTEM FOR MEASURING AN INNER DIAMETER OF A HOLE FORMED IN AN OBJECT

BACKGROUND OF THE INVENTION

1. Field of Invention

The present invention relates to a method and system for measuring an inner diameter of a hole in an object.

2. Description of Related Art

There has been known a non-contact measuring system for measuring the diameter of a hole in an object without contacting the object, wherein an image of the hole is enlarged by such means as a microscope. The distance between the ends of the enlarged image is measured using a measuring machine or an ocular micrometer. Alternatively, the image of the hole is applied to a charge-coupled device (CCD) camera so as to measure the dimension thereof.

These systems can only measure the diameter of the hole at a position near the surface of the object, and not inside the hole at an arbitrary position.

The applicant of the present invention has proposed in Japanese Laid-Open Patent Application No. 7-260439, a system wherein the diameter can be measured at any arbitrary position. In the system, the inner diameter of the hole is optically measured using the trigonometrical measurement method. Since an optical element must be placed inside the hole, the object to be measured by the system is limited to one having a large diameter. Hence, the system cannot be applied to a hole having a small diameter.

Japanese Laid-Open Patent Applications Nos. 7-27507 and 7-4919 disclose systems where the diameter of a hole having a relatively small diameter can be measured at an arbitrary inner position of the hole. Each of the systems has a laterally movable base, on which is mounted an annular object. On one longitudinal side of the base is placed a projection device for projecting a cross on an inner wall of the hole. On the opposite side of the base, a monitoring device for monitoring the projected image of the cross through an optical system is provided.

In order to measure the diameter in the hole in the object at an arbitrary position, the projection device is operated to form the cross on one side of the inner wall of the hole while monitoring the cross through the monitoring device. Thereafter, the base is moved so that the cross is projected on the opposite wall of the hole. The moved distance of the base is measured, and the inner diameter of the hole is calculated based on the measured distance.

In the systems disclosed in the above mentioned documents, the cross is projected on opposite positions of the inner wall. Namely, the positions of the two extreme sides of the hole are detected one at a time. In order to detect the positions, the base must be moved. Thus, it takes time to measure the diameter. Moreover, the position of the base must be precisely adjusted to accurately project the cross on the opposite walls. Hence, more time is necessary, and in addition, a measuring error is apt to occur.

SUMMARY OF THE INVENTION

The present invention relates to a method and system for measuring an inner diameter of a hole formed in an object without contacting the object, and more particularly to a method and system for optically measuring the diameter of a relatively small hole at an arbitrary position of the hole.

One aspect of the present invention is to provide a method and system for measuring a diameter of a hole where the diameter can be efficiently and accurately measured even in the case of the hole having a small diameter.

In accordance with an aspect of the present invention, a light beam from a light source is formed into an annular beam. An inner wall of the hole in the object to be measured is illuminated with the annular beam. The annular beam reflected from the inner wall of the hole is received as an annular image. A diameter of the annular image is then measured, thereby measuring an inner diameter of the hole.

A system of the present invention includes a light source, an illuminating optical system that forms a light beam from the light source into an annular beam to illuminate an inner wall of a hole in an object with the annular beam. Additionally, a monitoring optical system receives the annular beam reflected from the inner wall of the hole as an observable annular image.

According to one embodiment of the present invention, a light beam from a light source is formed into an annular beam, and an inner wall of a hole in an object is illuminated with the annular beam. The annular beam reflected from the inner wall of the hole is received as an annular image, and a diameter of the annular image is measured. Thus, an inner diameter of the hole can be measured from the diameter of the annular image.

For example, the diameter $\Phi$ of the hole can be obtained as follows.

$$\Phi = \phi/m$$

where $\phi$ is the diameter of the annular image, and m is the magnification of the formed image.

Therefore, an inner diameter having a comparatively small value can be effectively and accurately measured at an arbitrary position.

Preferably, the illuminating optical system includes a cone lens for forming the light beam from the light source into an annular beam having an expansion angle, and a convergent lens placed between the cone lens and the object and movable in a direction of an optical axis of the cone lens. Since the cone lens is used to form an annular beam, the intense rays at the center portion of the beam can be used, which is effective. In addition, since the expansion angle of the annular light beam can be changed, the illuminated position of the inner wall of the hole in the object can be changed. Thus, the inner diameter at any arbitrary position (i.e., along the length of the hole) can be easily measured.

A zoom lens may be placed between the cone lens and the hole in the object to function as means for changing the illuminated position of the inner wall.

Preferably the monitoring optical system includes an image formation lens for forming the annular beam reflected from the inner wall of the object into an annular image, a stop placed at a focal point of the image formation lens at an object side thereof, and an image receiver placed at an image formation face of the imaging lens.

By such a system, only the rays of the annular beam at the appropriate angle can be used, thereby eliminating undesirable rays. Thus, the accuracy of the measurement is improved.

Preferably in the case of a through hole, the light source and the illumination optical system are placed at one side of the hole in the object, and the monitoring optical system is placed at the other side of the hole.

In the case of a blind hole, the light source, the illumination optical system and the monitoring optical system are placed at the open side of the hole, and a half mirror is placed between the illumination optical system and the monitoring system. Thus, the inner diameter of the blind hole at an arbitrary position can be measured if the inner wall of the hole is diffusible.

BRIEF DESCRIPTION OF THE DRAWINGS

The invention will be described in conjunction with the following drawings in which like reference numerals designate like elements and wherein:

FIG. 1a is a schematic diagram of a system for measuring an inner diameter of a hole formed in an object according to an embodiment of the present invention;

FIG. 1b is a sectional view of the object;

FIG. 1c is an illustration showing an image of the hole in the object taken by a CCD camera provided in the system of FIG. 1 a;

FIG. 2a is a schematic diagram of a second embodiment of the present invention;

FIG. 2b is a sectional view of an object, the hole of which is measured in the system of FIG. 2a; and FIG. 2c is an illustration showing an image of the hole in the object of FIG. 2b.

DETAILED DESCRIPTION OF PREFERRED EMBODIMENTS

Referring to FIG. 1a, a measuring system for measuring an inner diameter of a hole is adapted to be used to measure a hole of, for example, an object 1 shown in FIG. 1b. The object 1 has a through hole 2 having an inner diameter $\Phi$. The system includes an illumination optical system 21, which applies an annular beam to the object 1, and a monitoring optical system 31 for monitoring the light beam passing through the hole 2 of the object 1. The object 1 is placed between the optical systems 21 and 31 when measuring the hole 2.

The illumination optical system 21 has a light source 11 such as, for example, a semiconductor laser, which emits a light beam. The light beam is applied to a condenser lens 22 so that the rays thereof are rendered parallel with each other. The light beam is further shaped by a cone lens 23 into an annular beam having an expansion angle, the rays spreading outward at a predetermined angle. A convergent lens 24, which is movable along the optical axis of the cone lens 23, is further provided, thereby illuminating the inner wall of the object 1. The cone lens 23 is also preferably movable in the direction of the optical axis thereof.

The monitoring optical system 31 includes an imaging lens 32 to which the light beam from the object 1 is applied through a small stop 33 placed at the front focal point of the imaging lens 32. A CCD camera 34, for example, is provided to receive an image formed at an image plane a of the lens 32 shown in FIG. 1a.

The object 1 is positioned between the illumination optical system 21 and the monitoring optical system 31 so that the axis of the hole 2 is aligned with the optical axes of both optical systems 21 and 31.

In operation, a light beam emitted from the light source 11 is applied to the condenser lens 22 to form parallel rays. The beam is further shaped into an annular beam by the cone lens 23 and enters the hole 2 in the object 1 through the convergent lens 24. The convergent lens 24 is adjusted in the front and rear directions as shown by the arrows b in FIG. 1a, so that the beam is illuminated at a desired measuring position in the hole 2 as shown by an arrow c.

The beam reflected from the inner wall of the hole 2 is applied to the imaging lens 32 through the stop 33, thereby forming an annular image as shown in FIG. 1c at the position a. The CCD camera 34 reads the image so that a diameter $\phi$ thereof is measured.

The diameter $\phi$ of the annular image is expressed as, $$\phi = 2f \cdot \tan\Theta$$

where $\Theta$ is the angle of the annular beam and f is the focal length of the imaging lens 32.

Since the value of the focal length is known, if the diameter $\phi$ of the annular image is detected, the angle $\Theta$ can be calculated. Therefore, if the distance between the stop 33 and the measuring position c in the hole 2 is t, the inner diameter $\Phi$ of the hole 2 is calculated as follows.

$$\Phi = 2t \cdot \tan\theta$$
$$= \phi \cdot t / f$$
$$= \phi / m$$

wherein m is the magnification of the formed image.

If the measuring range is about 5 mm and the magnification of the formed image is 5×, the relationship between the inner diameter $\Phi$ and the diameter $\phi$ of the annular image is expressed as, $$\Phi = \phi/5$$

If the inner diameter $\Phi$ of the hole 2 varies dependent on the position thereof in a range of 0.1 to 1 mm, the diameter $\phi$ of the annular image varies in a range of 0.5 to 5 mm. Hence the image can be shown on a display of a ⅔inch CCD camera. In such a case, when the stop 33 is so positioned that the distance t between the measuring point c and the stop 33 is 6 mm, it is necessary to change the angle $\Theta$ of the incident beam in the range of ±0.48° to ±4.76°.

In accordance with the present invention, a section of the hole 2 is detected as an annular image. By measuring the diameter of the annular image, the inner diameter of the hole 2 is calculated. Accordingly, even a hole having a relatively small inner diameter can be efficiently and highly accurately measured at any arbitrary position inside the hole 2. The cone lens 23 is provided to form an annular beam, so that the intense rays at the center portion of the beam are effectively used at the periphery. Thus the efficiency of the beam is improved. This is superior to forming an annular beam by simply masking the central portion of a beam, which is another, though less beneficial, possibility.

When the convergent lens 24 is moved along its optical axis, the position where the beam illuminates the inner wall of the hole 2 is changed. Thus, the inner diameter at any arbitrary position can be easily measured.

Furthermore, since the stop 33 is positioned at the front focal point of the imaging lens 32, only the rays of the annular beam at the appropriate angle enter the stop 33, thereby eliminating undesirable rays from being picked up by the CCD camera 34. Thus, the accuracy of the measurement is improved.

FIGS. 2a to 2c describe a second embodiment of the present invention, wherein an inner diameter of a blind hole is measured.

Referring to FIG. 2a, the measuring system of the second embodiment of the present invention includes illumination optical system 21 and monitoring optical system 31. The illumination optical system 21 is placed so that its optical axis is perpendicular to the axis of a hole 5 in an object 4. The optical axis of the monitoring optical system 31 coincides with the axis of the hole 5. A half mirror 41 is provided between the optical systems 21 and 31. The object 4 is positioned at the opposite side of the half mirror 41 from the monitoring optical system 31.

A light beam emitted from the light source 11 of the illumination optical system 21 is applied to the condenser lens 22 to form parallel rays. The beam is further shaped into an annular beam by the cone lens 23 and applied to the half mirror 41 through the convergent lens 24. The beam is reflected from the half mirror 41 so as to be introduced into the hole 5 in the object 4.

The light beam is reflected and diffused at the inner wall of the hole 5, and transmitted through the half mirror 41 to the monitoring optical system 31. Accordingly, an annular image shown in FIG. 2c is formed by the imaging lens 32 at the image plane a and picked up by, for example, a CCD camera 34. The diameter φ of the annular image is measured and the diameter Φ is calculated in the same manner as in the first embodiment.

Thus, in the second embodiment of the present invention, the diameter of a blind hole 5 can be measured. In the present embodiment, the hole 5 has a diffusing inner surface so that the distribution of the luminous intensity is changed slightly by the diffusion. This affects the accuracy in determining the position in the hole where the inner diameter is measured. However, the accuracy may be improved by using a value obtained by a corrector.

The illumination optical system 21 provided in the embodiments of the present invention may be modified to include a cone lens for forming an annular beam, and a zoom lens provided between the cone lens and the object to be measured.

Moreover, although the light beam emitted from the light source 11 (for example, a semiconductor laser) is formed into parallel rays by the condenser lens 22 in the presently described embodiments, a solid state laser or a gas laser, capable of continuous oscillation, may be used to emit an annular beam. The diameter of the annular image may be measured using, for example, such devices as a measuring machine, an ocular micrometer, and a measuring microscope where cross lines are aligned.

From the forgoing it will be understood that the present invention provides a system wherein a diameter of a relatively small hole can be accurately and efficiently measured at an arbitrary position.

While the invention has been described in conjunction with preferred specific embodiment thereof, it will be understood that this description is intended to illustrate and not limit the scope of the invention.

What is claimed is:

1. A method for measuring an inner diameter of a hole formed in an object, the method comprising the steps of:
   illuminating an inner wall of the hole with an annular light beam;
   receiving the annular light beam reflected from the inner wall of the hole and passed through an aperture plate and an imaging lens as an annular image; and
   calculating the inner diameter of the hole based on the annular image.

2. The method according to claim 1, further comprising reflecting the annular light beam with a half mirror before illuminating the inner wall of the hole with the annular light beam.

3. The method according to claim 2, wherein an optical axis of the annular light beam before being reflected by the half mirror is at approximately a 90° angle to an optical axis of the annular beam after being reflected from the inner wall of the hole.

4. The method according to claim 1, wherein the calculating step includes measuring a diameter of the annular image, and calculating the inner diameter of the hole by multiplying the annular image diameter with a magnification factor.

5. The method of claim 1, further comprising, prior to said illuminating step, forming a light beam into said annular light beam.

6. A system for measuring an inner diameter of a hole formed in an object, comprising:
   an illuminating optical system that irradiates an inner wall of the hole with an annular light beam;
   an aperture plate;
   an imaging lens; and
   a monitoring optical system that receives the annular light beam reflected from the inner wall of the hole and passed through the aperture plate and the imaging lens as an observable annular image.

7. The system according to claim 6, wherein the illuminating optical system comprises a cone lens that forms a light beam from a light source into the annular light beam having an expansion angle, and a convergent lens placed between the cone lens and the object and movable in a direction along an optical axis of the cone lens.

8. The system according to claim 6, wherein the illuminating optical system comprises a cone lens that forms a light beam from a light source into the annular beam having an expansion angle, and a zoom lens placed between the cone lens and the object.

9. The system according to claim 6, wherein the imaging lens forms the annular light beam reflected from the inner wall of the hole into an annular image, the aperture plate is placed between the imaging lens and the object at a focal point of the imaging lens, and the monitoring optical system comprises an image receiver placed at an image plane of the imaging lens.

10. The system according to claim 9, wherein the image receiver is a camera.

11. The system according to claim 6, wherein illuminating optical system is located on a first side of the hole, and the monitoring optical system is located on a second side of the hole opposite the first side of the hole.

12. The system according to claim 6, wherein the illuminating optical system and the monitoring optical system are located on a first side of the hole, and further comprising a half mirror located on an optical axis of the illuminating optical system and an optical path of the monitoring system.

13. The system according to claim 12, wherein the optical axis of the illuminating optical system is at approximately a 90° angle to the optical path of the monitoring optical system.

14. The system according to claim 12, wherein the optical axis of the illuminating optical system is at approximately a 90° angle to a central axis of the hole.

15. The system according to claim 6, further comprising a light source that emits light through the illuminating optical system.

16. The system according to claim 15, wherein the illuminating optical system forms a light beam emitted from the light source into the annular light beam.

* * * * *